United States Patent [19]

Chigira

[11] Patent Number: 4,949,052
[45] Date of Patent: Aug. 14, 1990

[54] CLOCK SIGNAL GENERATOR HAVING BACK-UP OSCILLATOR SUBSTITUTION

[75] Inventor: Kazumasa Chigira, Gumma, Japan

[73] Assignee: Mitsubishi Electric Manufacturing Co., Ltd., Gumma, Japan

[21] Appl. No.: 324,284

[22] Filed: Mar. 15, 1989

[30] Foreign Application Priority Data

Mar. 15, 1988 [JP] Japan ................................ 63-61146

[51] Int. Cl.$^5$ .............................................. H03K 3/00
[52] U.S. Cl. ...................................... 331/49; 307/219;
328/61; 328/104; 340/292
[58] Field of Search ...................... 331/49, 56; 307/64,
307/65, 219; 340/292; 328/61, 103, 104

[56] References Cited

U.S. PATENT DOCUMENTS

| | | | |
|---|---|---|---|
| 3,289,097 | 11/1966 | Martin | 331/49 |
| 4,156,200 | 5/1979 | Gomez | 307/219 X |
| 4,254,492 | 3/1981 | McDermott, III | 331/49 X |

OTHER PUBLICATIONS

Duke et al., "Redundancy Technique for Crystals Oscillators", IBM Technical Disclosure Bulletin, vol. 12, No. 1, Jun. 1969, pp. 147–148, 331–49.

*Primary Examiner*—Siegfried H. Grimm
*Attorney, Agent, or Firm*—Skjerven, Morrill, MacPherson, Franklin & Friel

[57] ABSTRACT

A clock signal generator comprising a first oscillator which normally supplies clock pulses to the output of the clock signal generator, a first counter for counting the pulses generated from the first oscillator and producing a carry signal after counting n1 pulses generated from the first oscillator, a second oscillator for producing clock pulses for possible back-up purpose, a second counter for counting the pulses generated from the second oscillator and adapted to produce a carry signal after counting n2 pulses generated from the second oscillator and to be reset by the carry signal from the first counter, n2 being larger than n1, and a control circuit which blocks the output from the second oscillator as long as no carry signal is supplied thereto from the second oscillator. Therefore, should the first oscillator fail to produce period pulses, the second counter is not reset any more and the control circuit stops blocking the pulses from the second oscillator and forwards them to the output of the clock signal generator. Thus, the clock signal generator can continue to supply clock pulses even when one of its oscillators should fail to operate properly, and the reliability of the clock signal generator is improved.

6 Claims, 2 Drawing Sheets

CLOCK SIGNAL GENERATOR HAVING BACK-UP OSCILLATOR SUBSTITUTION

TECHNICAL FIELD

The present invention relates to a clock signal generator for synchronizing the operation of digital circuits and, in particular, to such a clock signal generator having back-up means to improve the reliability of its operation.

BACKGROUND OF THE INVENTION

A digital circuit is normally equipped with a clock signal generator typically consisting of a crystal oscillator to synchronize its operation. Most electronic systems which are provided with various digital circuits are therefore dependent on clock signal generators for their satisfactory operation. Therefore, it is essential for securing the reliability of the operation of electronic systems to ensure the satisfactory operation of the clock signal generators.

BRIEF SUMMARY OF THE INVENTION

In view of such a recognition, a primary object of the present invention is to provide a clock signal generator which is reliable as to its operation.

A second object of the present invention is to provide a reliable clock signal generator which is relatively simple in structure and is therefore economical to manufacture.

According to the present invention, these and other objects can be accomplished by providing: a clock signal generator, comprising: a first oscillator for producing periodic pulses; a second oscillator for producing periodic pulses; detecting means for detecting the failure of said first oscillator to produce periodic pulses; and control means for outputting the periodic pulses generated from said first oscillator when said detecting means does not detect the failure of said first oscillator to produce periodic pulses, and outputting the periodic pulses produced from said second oscillator when said detecting means detects the failure of said first oscillator to produce periodic pulses.

In this way, the second oscillator can take over the task of supplying clock pulses when the first oscillator should fail to function normally. According to a preferred embodiment, said detecting means comprises first counting means for counting the periodic pulses produced from said first oscillator and producing a carry signal after counting n1 number of pulses, and second counting means for counting the periodic pulses produced from said second oscillator and producing a carry signal after counting n2 number of pulses; and said second counting means is adapted to be reset by said carry signal of said first counting means, n2 being larger than n1 and said control means being adapted to output the periodic pulses from said second oscillator when said carry signal from said second counting means is supplied to said control means.

Such a structure may be constructed with a simple circuit if said control means is adapted to continue to output the periodic pulses from said second oscillator once said control means has received said carry signal from said second counting means even after said first oscillator has resumed to produce periodic pulses; and is provided with power-on reset means which is activated when electric power to said clock signal generator is turned on to cause said control means to output the pulses from said first oscillator if said first oscillator is producing periodic pulses. In particular, it is preferable if said detecting means comprises a D-type flip-flop circuit having an input terminal D constantly pulled up to a high level, and a clock input terminal T adapted receive said carry signal from said second counting means. A particularly simple arrangement may be achieved if said control means comprises an AND gate having a first input connected to the output of said second oscillator and a second input connected to the output terminal Q of said flip-flop circuit, and an exclusive OR gate having a first input connected to the output of said AND gate, a second input connected to the output of said first oscillator, and an output serving as the output of said clock signal generator.

BRIEF SUMMARY OF THE INVENTION

Now the present invention is described in the following with reference to the appended drawings, in which:

FIG. 1 is a block diagram of an embodiment of the clock signal generator according to the present invention; and FIG. 2 is a time chart for illustrating the operation of the clock signal generator given in FIG. 1.

DETAILED DESCRIPTION OF THE PREFERRED EMBODIMENT

Figure 1:
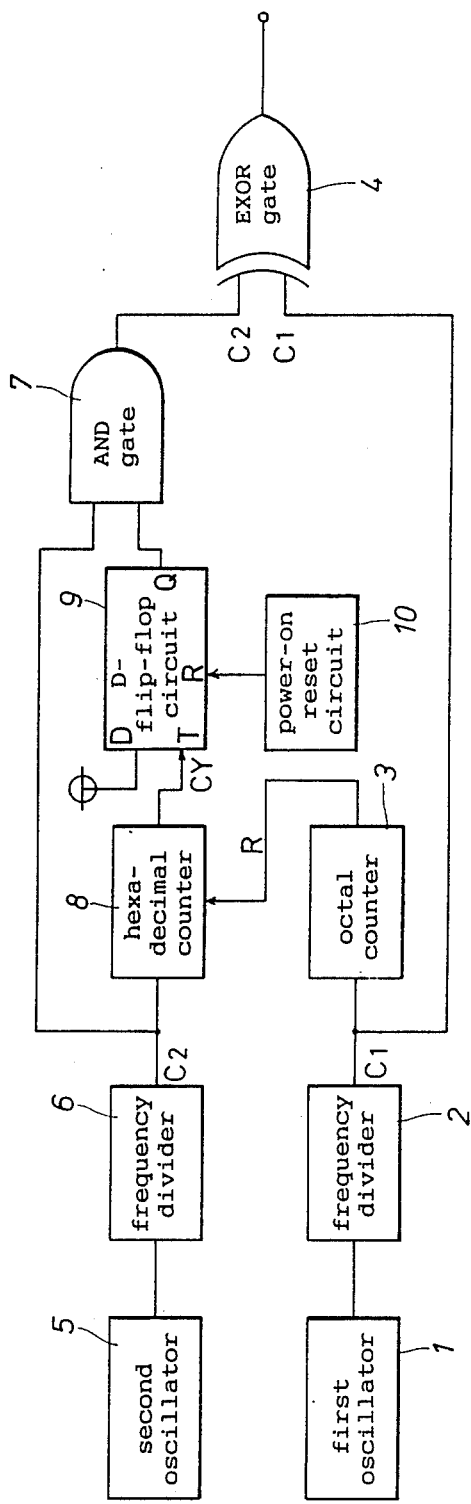

FIG. 1 shows a first embodiment of the clock signal generator according to the present invention. This clock signal generator comprises a first oscillator 1, a frequency divider 2 connected thereto, and an octal counter 3 and an exclusive OR gate 4 which are connected to the output end of the frequency divider 2. The output end of the octal counter 3 is connected to a reset terminal of a hexadecimal counter 8 which is described hereinafter, and supplies a reset signal R to the hexadecimal counter 8 upon counting eight clock pulses C1 transmitted thereto from the first oscillator 1 via the frequency divider 2.

The clock signal generator further comprises a second oscillator 5 which is similar to the first oscillator 1, and a frequency divider 6 connected to the output end of the second oscillator 5. The output end of the frequency divider 6 is connected to one of the two input ends of an AND gate 7 as well as to the input end of the hexadecimal counter 8. The output end of the hexadecimal counter 8 is connected to the clock input terminal T of a D-type flip-flop circuit 9 so that the hexadecimal counter 8 supplies a carry signal CY to the flip-flop circuit 9 upon counting 16 clock pulses C2 produced from the frequency divider 6. The input terminal D of the flip-flop circuit 9 is always fixed to a high level. Therefore, the output terminal Q of this flip-flop circuit 9 is pulled up to a high level once it has received a carry signal CY from the hexadecimal counter 8 and this state is maintained until the operation of this clock signal generator is terminated.

The output terminal Q of this flip-flop circuit 9 is connected to the other input end of the AND gate 7, and the output end of the AND gate 7 is connected to the other input end of the exclusive OR gate 4. The flip-flop circuit 9 is additionally connected to a power-on reset circuit 10 which resets the flip-flop circuit 9 so as to initialize the output level of the flip-flop circuit 9 to a low level every time the clock signal generator is started by turning on the power to the clock signal generator.

Figure 2:
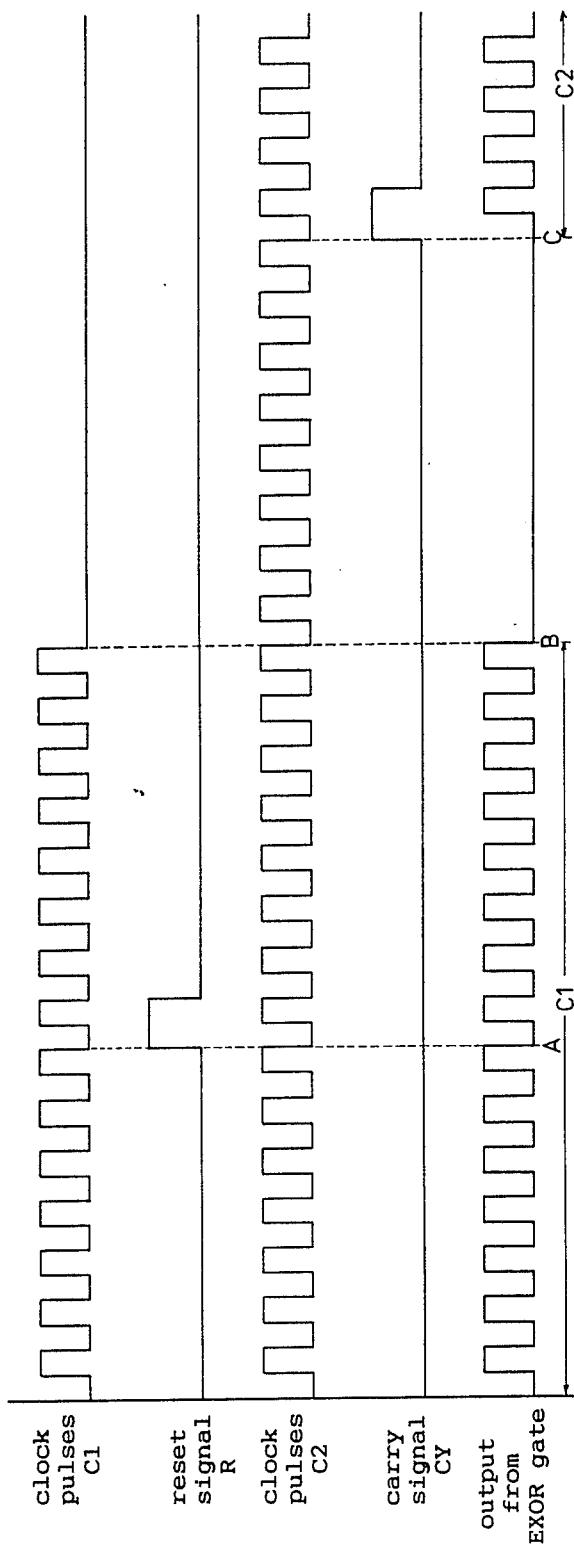

FIG. 2 is a time chart showing the operation of the clock generator shown in FIG. 1, and the operation thereof is now described in the following with reference to this time chart.

Under normal condition, the clock pulses C1 supplied from the frequency divider 2 connected to the first oscillator 1 are supplied to the octal counter 3 and the exclusive OR gate 4. At the same time, the clock pulses C2 from the frequency divider 6 connected to the second oscillator 5 are supplied to the hexadecimal counter 8 and the AND gate 7. And, as indicated as a time point A in FIG. 2, when the octal counter 3 has counted eight clock pulses C1 from the first oscillator 1, a reset signal R is supplied from the octal counter 3 to the hexadecimal counter 8. Therefore, as long as the first oscillator 1 is functioning normally, since the hexadecimal counter 8 is always reset before it gets to count 16 clock pulses C2, no carry signal CY is supplied from the hexadecimal counter 8 to the flip-flop circuit 9. Therefore, the flip-flop circuit 9 remains in the reset state, and the signal level of the line leading from the output end of the AND gate 7 to the input end of the exclusive OR gate 4, along with the output terminal Q of the flip-flop circuit 9, remains low so that the clock pulses C1 from the first oscillator 1 are transmitted to an external circuit via the exclusive OR gate 4 while the clock pulses from the second oscillator 5 are blocked by the AND gate 7.

Should the first oscillator 1 fail to function normally at time point B, there will be no more clock pulses C1 from the first oscillator 1. Therefore, no more reset signals R are supplied from the octal counter 3 to the hexadecimal counter 8, and it follows that the hexadecimal counter 8 eventually supplies a carry signal CY to the flip-flop circuit 9 when the hexadecimal counter 8 has counted 16 clock pulses C2 from the frequency divider 6 connected to the second oscillator 5 as shown by the time point C in FIG. 2. This causes the flip-flop circuit 9 to be set and to supply a high level signal to the AND gate 7, and, from then on, the clock pulses C2 are supplied to the exclusive OR gate 4 via the AND gate 7. The clock pulses C2 are then supplied from the exclusive OR gate 4 to the external circuit not shown in the drawings. Here, the clock pulses C2 derived from the second oscillator 5 are produced from the exclusive OR gate 4 without regards to whether the output from the oscillator 1 has stopped at a high level or a low level. When the clock signal generator is restarted, the flip-flop circuit 9 will be reset by the power-on reset circuit 10, and the output terminal Q of the flip-flop circuit 9 will be brought back to a low level. If the first oscillator 1 successfully started producing clock pulses again, the hexadecimal counter 8 would be then continually reset by the carry signal from the octal counter 3 as mentioned earlier, and the clock pulses C1 derived from the oscillator 1 would have the priority over the clock pulses C2 derived from the second oscillator 5 and would be outputted from the exclusive OR gate 4.

Conversely, when the oscillator 5 has stopped functioning properly, it will not affect the operation of the clock signal generator as long as the clock pulses C1 from the oscillator 1 are transmitted, via the frequency divider 2 and the exclusive OR gate 4, to the external circuit.

Although the counter 3 was an octal counter and the counter 8 was a hexadecimal counter in the above described embodiment, the two counters may be otherwise as long as the first counter 3 produces a reset signal before the second counter 8 counts up.

Thus, according to the present invention, even when one of the oscillators has failed, the other counter immediately takes over the task of generating a clock signal without any discontinuity, and a very high level of reliability can be attained.

What is claimed is:

1. A clock signal generator, comprising:
    a first oscillator for producing periodic pulses;
    a second oscillator for producing periodic pulses;
    detecting means for detecting the failure of said first oscillator to produce periodic pulses; and
    control means for outputting the periodic pulses generated from said first oscillator when said detecting means does not detect the failure of said first oscillator to produce periodic pulses, and outputting the periodic pulses produced from said second oscillator when said detecting means detects the failure of said first oscillator to produce periodic pulses;
    wherein said detecting means comprises:
        counting means for counting the periodic pulses produced from said second oscillator and producing a carry signal after counting n number of pulses, n being an integer greater than one; and
        means for resetting said counting means before said counting means counts to n as long as said detecting means does not detect said failure of said first oscillator.

2. A clock signal generator, comprising:
    a first oscillator for producing periodic pulses;
    a second oscillator for producing periodic pulses;
    detecting means for detecting the failure of said first oscillator to produce periodic pulses; and
    control means for outputting the periodic pulses generated from said first oscillator when said detecting means does not detect the failure of said first oscillator to produce periodic pulses, and outputting the periodic pulses produced from said second oscillator when said detecting means detects the failure of said first oscillator to produce periodic pulses,
    wherein said detecting means comprises first counting means for counting the periodic pulses produced from said first oscillator and producing a carry signal after counting n1 number of pulses, and second counting means for counting the periodic pulses produced from said second oscillator and producing a carry signal after counting n2 number of pulses; and said second counting means is adapted to be reset by said carry signal of said first counting means, n2 being larger than n1 and said control means being adapted to output the periodic pulses from said second oscillator when said carry signal from said second counting means is supplied to said control means.

3. A clock signal generator as defined in claim 2, wherein said control means is adapted to continue to output the periodic pulses from said second oscillator once said control means has received said carry signal from said second counting means even after said first oscillator has resumed to produce periodic pulses; and is provided with power-on reset means which is activated when electric power to said clock signal generator is turned on to cause said control means to output the pulses from said first oscillator if said first oscillator is producing periodic pulses.

4. A clock signal generator as defined in claim 3, wherein said detecting means comprises a D-type flip-flop circuit having an input terminal D constantly pulled up to a high level, a clock input terminal T adapted to receive said carry signal from said second counting means, and a reset terminal R connected to said power-on reset means.

5. A clock signal generator as defined in claim 2, wherein said detecting means comprises a D-type flip-flop circuit having an input terminal D constantly pulled up to a high level, and a clock input terminal T adapted to receive said carry signal from said second counting means.

6. A clock signal generator as defined in claim 5, wherein said control means comprises an AND gate having a first input connected to the output of said second oscillator and a second input connected to the output terminal Q of said flip-flop circuit, and an exclusive OR gate having a first input connected to the output of said AND gate, a second input connected to the output of said first oscillator, and an output serving as the output of said clock signal generator.

* * * * *

UNITED STATES PATENT AND TRADEMARK OFFICE
CERTIFICATE OF CORRECTION

PATENT NO.   : 4,949,052
DATED        : August 14, 1990
INVENTOR(S)  : Kazumasa Chigira It is certified that error appears in the above-identified patent and that said Letters Patent is hereby corrected as shown below:

ON THE TITLE PAGE:    Item [73]
Correct assignee is --Mitsuba Electric Manufacturing Co., Ltd.--

Signed and Sealed this

Thirteenth Day of October, 1992

Attest:

DOUGLAS B. COMER

*Attesting Officer*     Acting Commissioner of Patents and Trademarks